(12) United States Patent
Kawaguchi (10) Patent No.: US 6,241,230 B1
(45) Date of Patent: Jun. 5, 2001

(54) GUIDE APPARATUS HAVING DUSTPROOF STRUCTURE

(75) Inventor: Takahiro Kawaguchi, Tokyo-to (JP)

(73) Assignee: THK Co., LTD, Tokyo-to (JP)

( * ) Notice: Subject to any disclaimer, the term of this patent is extended or adjusted under 35 U.S.C. 154(b) by 0 days.

(21) Appl. No.: 09/498,467

(22) Filed: Feb. 4, 2000

(30) Foreign Application Priority Data

Feb. 10, 1999 (JP) .................................................. 11-033176

(51) Int. Cl.[7] ...................................................... B23Q 1/25
(52) U.S. Cl. ............................ 269/73; 269/285; 310/12; 384/15; 403/387
(58) Field of Search ...................... 269/73, 285; 409/235; 403/381, 338, 335, 336, 322, 323, 324

(56) References Cited

U.S. PATENT DOCUMENTS

| | | | |
|---|---|---|---|
| 5,410,922 | * | 5/1995 | Katahira ................................ 74/89.15 |
| 5,551,795 | * | 9/1996 | Engilbarov .............................. 403/381 |
| 5,598,043 | * | 1/1997 | Hirano et al. ............................ 310/12 |
| 5,871,283 | * | 2/1999 | Isobe ...................................... 384/15 |
| 5,915,916 | * | 6/1999 | Saji ........................................ 414/749 |

* cited by examiner

Primary Examiner—Joseph J. Hail, III
Assistant Examiner—Daniel Shanley
(74) Attorney, Agent, or Firm—Young & Thompson

(57) ABSTRACT

A guide apparatus having a dustproof structure comprises: a linear guide device; an outer cover mounted to the linear guide device so as to cover the linear guide device and provided with an opening, the linear guide device including a movable member having a side lug portions projecting outward through the opening formed to the outer cover and the movable member being movable along the opening; and a sealing structure having a plurality of seal members each in shape of belt and having flexibility. The seal members are applied to edge portions of the opening of the outer cover so as to be overlapped to each other thereby to substantially keep a sealed state inside the linear guide device. The sealed seal members are separated and pushed aside by a guide structure formed to the movable member at a time of the advancing motion thereof with the sealed state inside the linear guide device being substantially maintained.

18 Claims, 10 Drawing Sheets

GUIDE APPARATUS HAVING DUSTPROOF STRUCTURE

BACKGROUND OF THE INVENTION

The present invention relates to a guide apparatus having a dustproof structure (hereinlater, which may be called "dustproof guide apparatus") for guiding a movable table or the like, and more particularly, to a dustproof guide apparatus provided with an outer (armor) cover.

Figure 10:
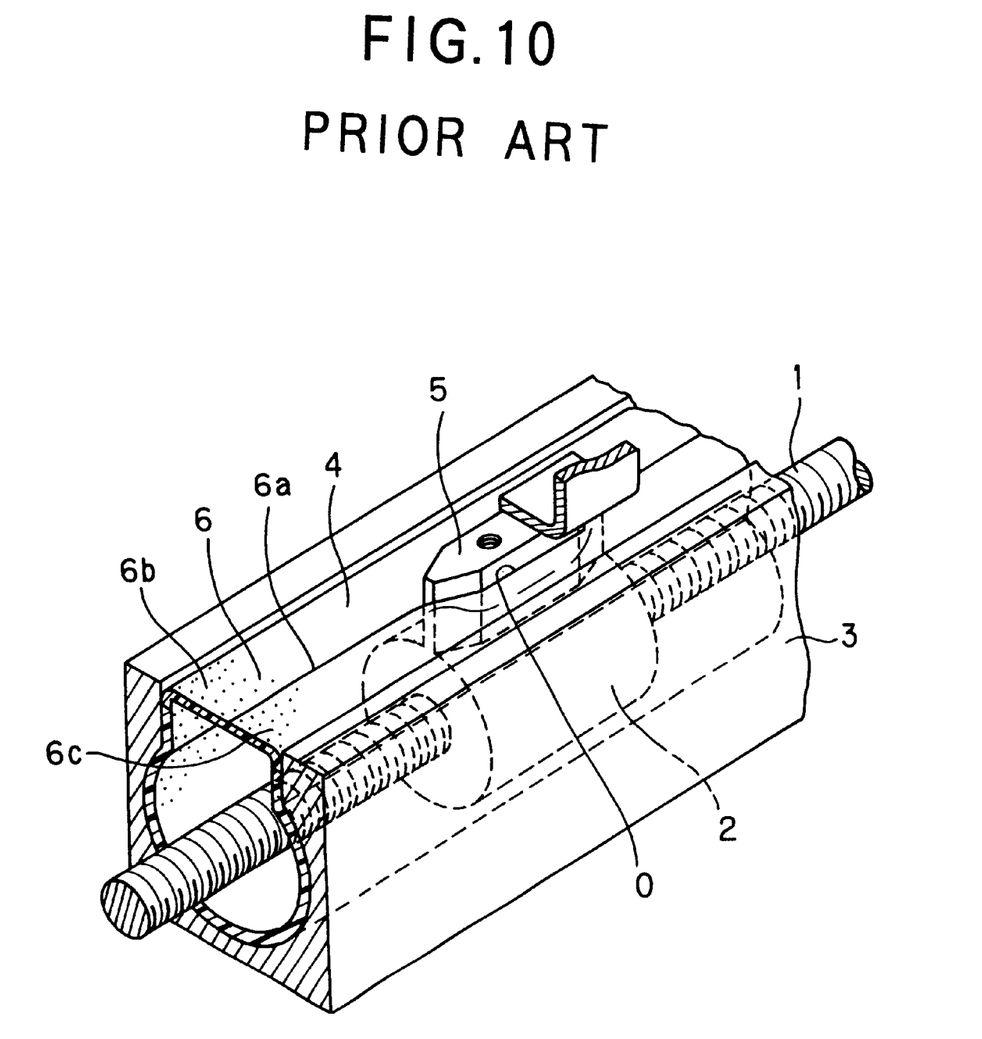
FIG. 10 is a perspective view showing a conventional dustproof guide apparatus.

FIG. 10 shows one example of a conventionally known dustproof guide apparatus utilizing a ball screw. The dustproof guide apparatus shown in FIG. 10 comprises a screw shaft 1 supported only to be rotatable, a nut member 2 screwed to the screw shaft 1 and an outer cover 3 covering the screw shaft 1 and the nut member 2. The outer cover 3 is formed with an upper opening 4, in an illustrated state, in parallel to the screw shaft 1. The nut member 2 is integrally formed with a movable member 5, which is secured to a member to be guided, in a manner such that the movable member 5 is moved linearly along the opening in accordance with the rotation of the screw shaft 1. The opening 4 of the outer cover 3 is covered by a seal member 6 made of rubber, and the seal member 6 is formed with one linear cut (cut line) 6a along the screw shaft 1. The movable member 5 forcibly bents outward the seal member 6 along the cut line 6a so as to project outward through an opening O formed by forcibly bending the seal member 6. The movable member 6 carries out a linear reciprocal motion along the cut line 6a while widening both sides of the cut line 6a of the seal member 6. According to this structure, dust or the like generated from the ball screw can be prevented from being discharged outward by covering the screw shaft 1 and the nut member 2 by the outer cover 3 and the seal member 6.

However, in the structure of the dustproof guide apparatus shown in FIG. 1 in which the linear cut 6a is formed to the seal member 6, a gap having a slight width will appear between portions 6b and 6c of the seal member 6 facing each other along the cut line 6a, and the width of this gap will be gradually widened while the movable member 5 being reciprocally moved repeatedly, which provides a problem such that dust or the like is discharged through such widened gap outward the outer cover 3. Thus, according to the structure of the conventional dustproof guide apparatus such as shown in FIG. 10, it is difficult to achieve high dustproof property.

SUMMARY OF THE INVENTION

An object of the present invention is to substantially eliminate defects or drawbacks encountered in the prior art mentioned above and to provide a guide apparatus having dustproof structure capable of achieving high dustproof performance.

This and other objects can be achieved according to the present invention by providing, in a broader aspect, a guide apparatus having a dustproof structure comprising:

a linear guide device;

an outer cover mounted to the linear guide device so as to cover the linear guide device and provided with an opening, said linear guide device including a movable member having a portion projecting outward through the opening formed to the outer cover, the movable member being movable along the opening; and a sealing structure having a plurality of seal members each in shape of belt and having flexibility, the seal members being applied to edge portions of the opening of the outer cover so as to be overlapped to each other thereby to substantially keep a sealed state inside the linear guide device.

In preferred embodiments of this aspect, the movable member has a guide structure provided with a sharp end portion to separate and push aside the overlapped seal members in accordance with an advancing motion of the movable member, the guide structure being provided with a side portion gradually widened outward in a direction reverse to the advancing direction of the movable member.

The guide structure is formed integrally with the movable member or formed as a member independent from the movable member.

The movable member is provided with a closing member for closing the opening of the seal members.

A sliding surface between the guide structure and the sealing structure is formed with a protrusion extending continuously in a longitudinal direction thereof.

According to the structures of the present invention of this aspect, the following advantageous effects or functions will be attained as well as achieving the above object.

Since the seal members have overlapped end portions, any gap is not formed between the respective seal members thereby to completely keep the inside of the outer cover, i.e. the linear guide device. The movable member is moved so as to forcibly push aside and open the seal members, and the seal members are then returned to their original shapes because of their own flexible or elastic property. That is, according to the structure of the guide apparatus of the present invention, the seal members are only opened at the portions at which the movable member is passing and portions of the seal members other than these portions are completely closed during the advancing motion of the movable member, thus realizing the guide apparatus having high dustproof structure.

Furthermore, according to the preferred embodiments, the seal members are gently deformed by the guide structure at the time of the reciprocal motion of the movable member, and after passing the movable member, the seal members are gently closed in the original closing state, thus surely preventing a gap between the guide structure and the seal members from causing.

By separately, i.e. independently forming the guide structure, relatively complicated guide structure can be easily manufactured, thus easily manufacturing the movable member itself.

In a case where the movable member carries out the repeated reciprocal motions, there may cause a case that the seal members maintain the bent shapes and are not completely returned to their original shapes. According to the present invention, such bent portions of the seal members are forcibly pressed inward by the closing member such as rod-shaped pins, whereby the seal members can be more surely closed after the passing of the movable member.

Furthermore, the location of the continuous protrusions of the sliding surface can reduce the friction resistance between the guide structure and the seal structure, thus smoothly performing the linear motion of the movable member.

In another aspect of the present invention, there is provided a guide apparatus having a dustproof structure comprising:

a linear guide device generally having a ⊐-shaped cross section having an opening;

an outer cover mounted to the linear guide device so as to cover the opening of the ⊐-shaped guide device and provided with an opening, the linear guide device including a movable member and a linear member along which the movable member is reciprocally moved, the movable member having a portion projecting outward through an opening formed between the outer cover and the linear guide device to be movable along the opening formed between the outer cover and the linear guide device; and a sealing structure having a plurality of seal members each in shape of belt and having flexibility, the seal members being applied to edge portions of the opening formed between the outer cover and the linear guide device so as to be overlapped to each other thereby to cover the opening between the outer cover and the linear guide device and substantially keep a sealed state inside the linear guide device.

In preferred embodiments of this aspect, the movable member comprises a movable body, side portions formed as the projections on both sides of the movable member and coupling portions through which the movable body and the side portions are connected to each other, the coupling portions being positioned in a level corresponding to the overlapped portions of the seal members.

The coupling portions have sharp end portions in the moving direction of the movable member.

The coupling portions may be formed with guide pieces at both end portions thereof along the moving direction of the movable member, the guide pieces each having a sharp end portion in the moving direction of the movable member so as to separate and push aside the overlapped seal members in accordance with an advancing motion of the movable member, the guide piece being provided with a side portion gradually widened outward in a direction reverse to the advancing direction of the movable member. The guide pieces are formed integrally with the coupling portion of the movable member or independent from the coupling portions of the movable member.

The movable member is provided with a closing member, the closing member comprising two pairs of rod shaped pins attached to the side portions of the movable members so as to project inward in a manner opposing to each other on both sides of the movable member in the moving direction thereof, the pins having front ends substantially extending to the overlapped portions of the seal members.

The seal members are formed of rubber or synthetic resin material having flexibility.

The seal members are applied to side portions of the outer cover by means of bonding agent and each of said seal members is tapered to a front end. The outer cover may be formed with dovetail grooves and the seal members have swelled end portions which are to be fitted to the dovetail grooves of the outer cover.

According to this aspect of the embodiment of the present invention, substantially the same functions and effects mentioned above with reference to the first aspect of the present invention will be achieved.

The nature and further characteristic features of the present invention will be made more clear from the following descriptions made with reference to the accompanying drawings.

BRIEF DESCRIPTION OF THE DRAWINGS

In the accompanying drawings:

FIG. 6 represents a guide piece and includes FIG. 6A being a perspective view of the guide piece, FIG. 6B being a plan view thereof and FIG. 6C being a side view thereof;

DESCRIPTION OF THE PREFERRED EMBODIMENT

Figure 1:
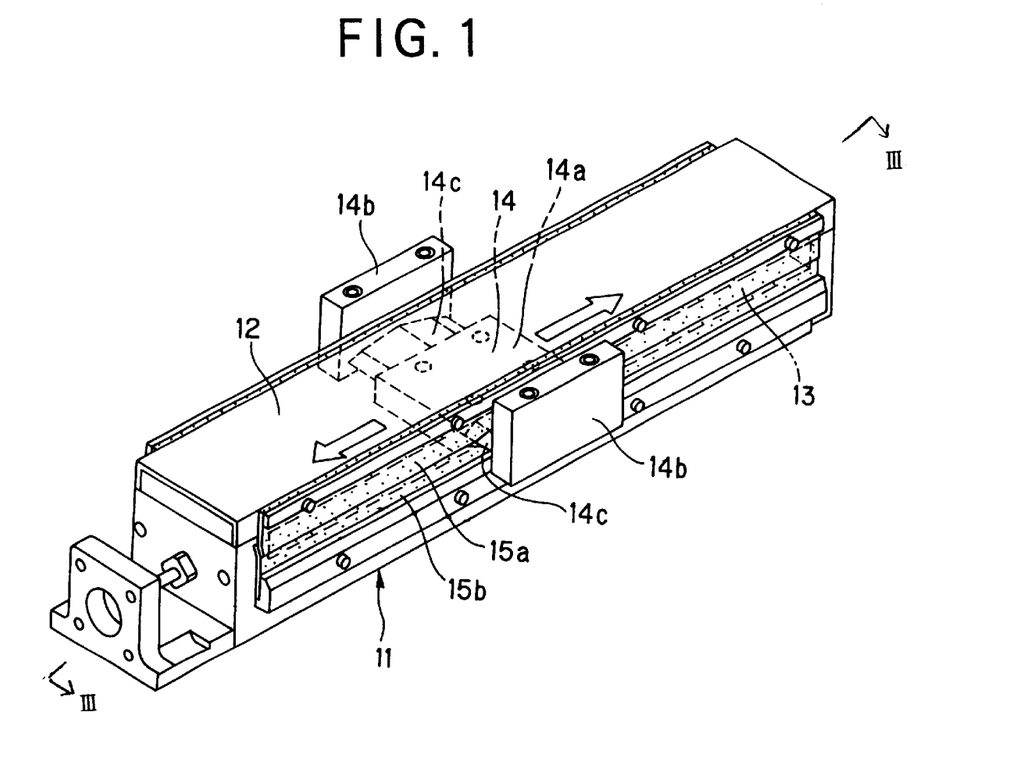
FIG. 1 is a perspective view of a guide apparatus having dustproof structure according to one embodiment of the present invention.
Figure 2:
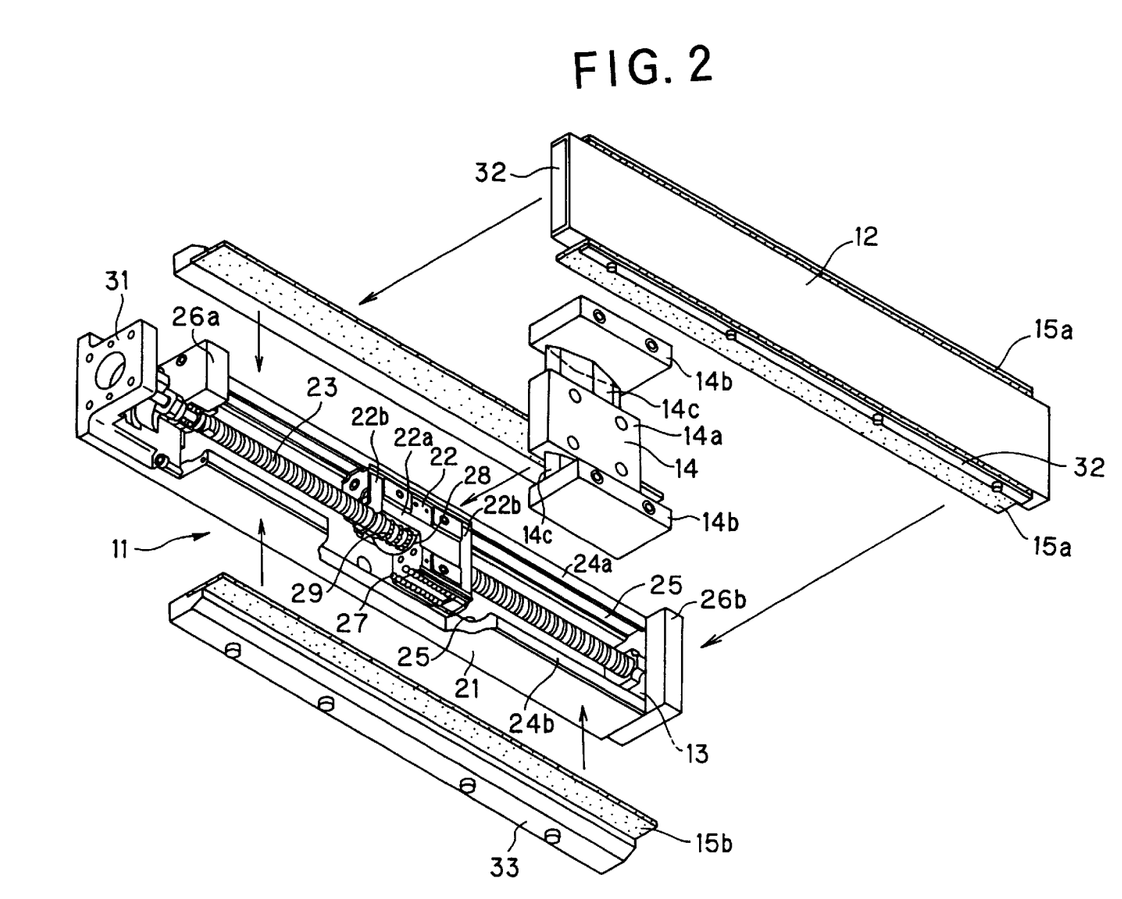
FIG. 2 is a developed perspective view of the guide apparatus of FIG. 1.

First, with reference to FIGS. 1 and 2 showing a guide apparatus having dustproof structure according to the present invention (hereinlater, which may be called "dustproof guide apparatus or merely guide apparatus), the dustproof guide apparatus comprises a linear guide device 11 guiding a object as table on a fixed portion such as bed or saddle and an outer (armor) cover 12 mounted to an upper portion, as viewed, of the linear guide device 11.

A pair of openings 13 are formed between side surfaces of the outer cover 12 and the side surfaces of the linear guide device 11. The movable member 14 attached to the object has portions projecting outward through these openings 13, and while maintaining this state, the movable member 14 linearly moves in the longitudinal direction of the guide device 11 along the openings 13. The openings 13 are closed or covered by a pair of seal members 15a and 15b attached to upper and lower edge portions of the openings 13.

The linear guide device 11 comprises, as shown in FIG. 2, a guide rail 21 disposed on the fixed portion, a slide member 22, in form of block, which is linearly guided along the guide rail 21, the movable member 14 mounted to an upper surface of the slide member 22 and a ball screw 23 as a feed screw member for driving the slide member 22.

The guide rail 21 has a ⊐-shaped section having an upper opening in an illustrated state. That is, the guide rail 21 is composed of a bottom flat portion and a pair of opposing projections 24a and 24b extending in parallel to each other at both longitudinal edge portions of the flat bottom portion so as to provide the ⊐-shaped section. The bottom portion is formed with bolt holes for fixture. The inside surface of the respective projections 24a and 24b are formed with a recessed grooves 25, each having a wide breadth, throughout the longitudinal directions thereof. Two ball rolling grooves are formed to the upper and lower portions, respectively, of corner portions of the recessed grooves 25. That is, totally four ball rolling grooves are formed. Both the longitudinal end portion of the ⊐-shaped guide rail are closed by means of housings 26a and 26b, respectively, each of which has a height higher than that of the projections 24a and 24b and which has a width substantially the same as that of the guide rail 21 itself.

The slide member 22 is composed of a block body 22a and end plates 22b attached to both longitudinal end portions of the block body 22a. The slide member 22 is fitted into the recessed upper portion of the ⊐-shaped guide rail and supported to be slidable between both the projections 24a and 24b through balls 27 as rolling members.

The block body 22a of the slide member 22 has both side surfaces to which four loaded ball rolling grooves are formed so as to correspond to the ball rolling grooves formed to the guide rail 21, and a number of balls 27 are disposed to be rollable between opposing ball rolling grooves of the guide rail 21 and the loaded ball rolling grooves formed to the block body 22a, respectively.

The block body 22a is formed, at its central portion, with a ball screw hole 28 extending throughout in the longitudinal direction thereof, and a ball screw shaft 23 is screwed with this screw hole 28. The ball screw hole 28 is formed with a spiral loaded ball rolling groove so as to correspond to a spiral ball rolling groove formed to the outer peripheral portion of the ball screw shaft 23, and a number of balls 29 are disposed to be rollable between the spiral loaded ball rolling groove of the ball screw shaft 23 and the spiral ball rolling groove of the ball screw hole 28.

Screw holes are formed to the upper surface of the block body 22a for attaching the movable member 14 by means of bolt or the like.

Two rows of ball escaping holes are formed to each side of the ball screw hole 28, i.e. totally four holes, corresponding to the respective loaded ball rolling grooves of the block body 22a, for escaping the balls in the loaded area. The ball screw hole 28 penetrating the central portion of the block body 22a is formed with a screw groove at an about half length area in the longitudinal direction thereof and a return passage is formed by a return tube.

Each of the end plates 22b is a member having substantially rectangular shape similar to that of the end face of the block body 22a and an insertion hole for inserting the ball screw shaft 23 is formed at a central portion thereof, and bolt holes are formed to both bilateral sides of the insertion hole. The end plates 22b are fixed to the block body 22a by means of bolts inserted into these bolt holes. Four return passages are formed to the end plates 22b so as to escape the balls 27 in the loaded area between the block body 22a and the guide rail 21 and then to return the balls 27 again to the loaded area.

Figure 3:
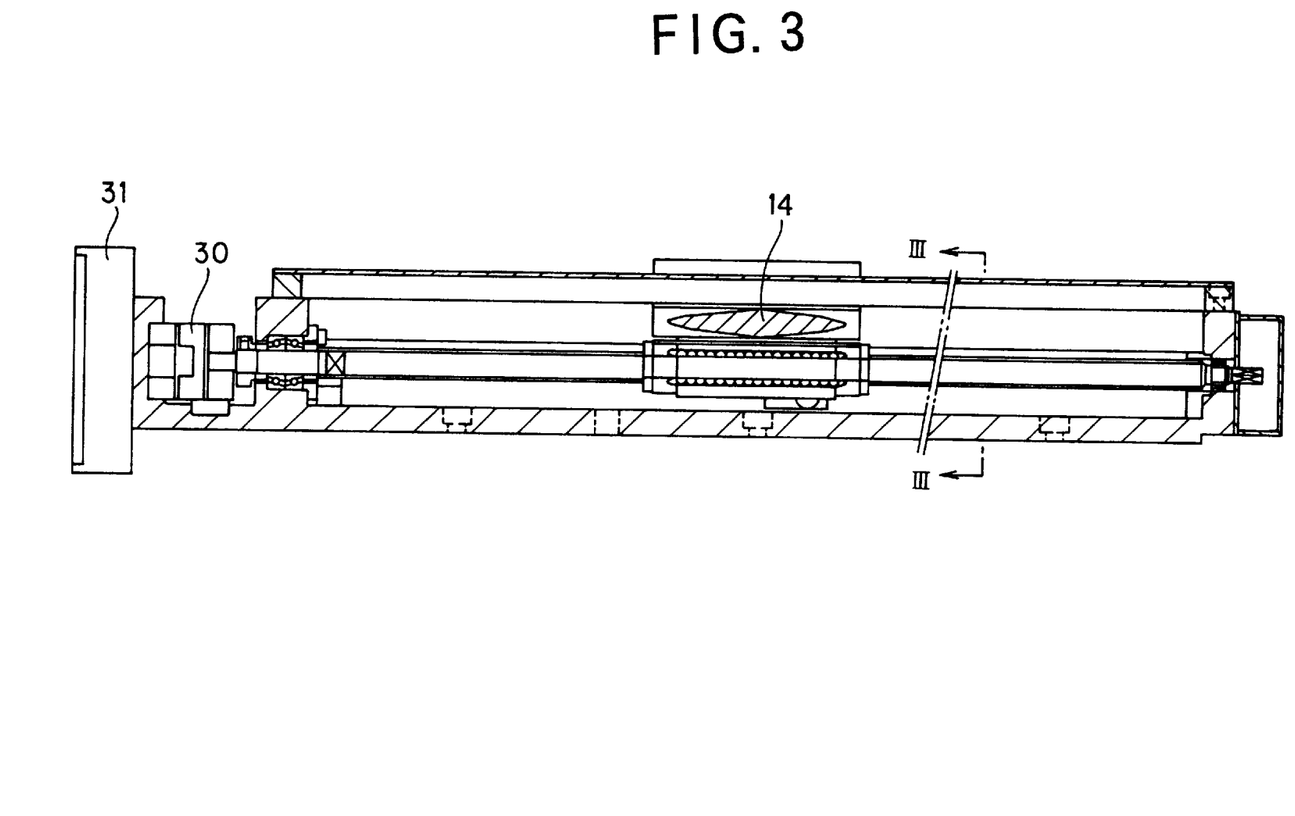
FIG. 3 is a longitudinal sectional view taken along the line III—III in FIG. 1.

The screw shaft 23 is supported at its both end portions by the housings 26a, 26b only to be rotatable and formed, at its outer peripheral surface, with a spiral ball rolling groove along which the balls 29 roll. As shown in FIG. 3, a coupling 30 is mounted to one end of the screw shaft 23 and the coupling 30 is operatively connected to an output shaft of a motor, which is mounted to an intermediate flange 31 extending from the housing 26a (or 26b ).

With reference to FIG. 2, the movable member 14 is provided with a movable body 14a and a pair of lugs (side pieces) 14b connected to the side portions of the movable body 14a through coupling pieces 14c. The movable body 14a is formed with bolt insertion holes for fastening the movable member 14 to the slide member 22 by means of bolts. In an illustrated, i.e. installed state, of the movable member 14, screw holes are formed to the upper surfaces of the side pieces 14b and a member or unit to be guided is mounted to the side pieces 14b of the movable member 14 by inserting screws or like means into these screw holes. As shown in FIG. 3, the coupling piece 14c has substantially a bilaterally symmetrical streamline shape in section taken along a plane including the seal members 15a formed to the movable member 14. That is, the coupling piece 14c has both bilateral ends each having a sharp projected shape and the opposing sides forming the sharp end projection are once bent at intermediate portion towards the central portion of the coupling piece 14c thereby to make gentle the inclination curve thereof.

The outer cover 12 is formed, as shown in FIG. 2, from substantially a long-shaped rectangular thin plate member by bending longitudinal side edges thereof, and a pair of spacers 32 are attached to lower surfaces of longitudinal ends thereof. The outer cover 12 is fixed to the linear guide device 11 by fixing the spacers to the housings 26a, 26b of the guide device 11. In the state that the outer cover 12 is mounted to the linear guide device 11, a step (staged portion) is formed between the housing 26b and the projected side portions 24a, 24b of the guide rail 21, thereby to provide a pair of openings 13 each in a rectangular shape between the side surfaces of the outer cover 12 and the projected side portions 24a, 24b as shown in FIG. 1. The coupling pieces 14c of the movable member 14 extend outward through these openings 13 and, hence, the side pieces (lugs) 14b, 14b, to which a member or unit to be guided is mounted, of the movable member 14 are externally exposed.

The upper seal member 15a in shape of belt is attached to the side surface of the outer cover 12, i.e. upper portion of the edge forming the opening 13, so as to extend along the entire longitudinal length of the opening 13. This upper seal member 15a is formed of a rubber or synthetic resin in a long rectangular shape and secured to the side surface of the outer cover 12 by a seal press 32 using a screw or the like. On the other hand, the lower seal member in shape of belt is also attached to the side surface of the outer cover 12, i.e. lower portion of the edge forming the opening 13, so as to extend along the entire longitudinal length of the opening 13. This lower seal member is also secured to the side surface of the outer cover 12 by a seal press 33.

Figure 4:
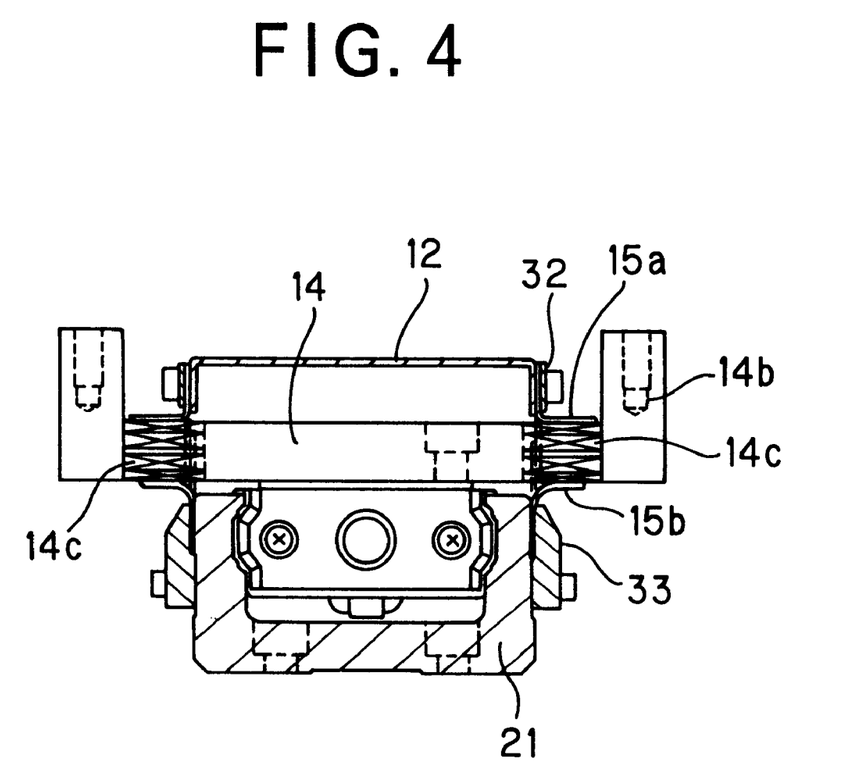
FIG. 4 is a sectional view taken along the line IV—IV in FIG. 3.

As shown in FIG. 4, the lower end portions of the upper seal members 15a and the upper end portions of the lower seal members 15b are overlapped to each other, with the upper seal member 15a being positioned outside, as shown with broken lines so as to entirely cover the openings 13. Since the coupling pieces 14c of the movable member 14 project outward through the openings 13, these upper and lower seal members 15a and 15b are bent in the shapes along the upper and lower surfaces of the coupling pieces 14c when the coupling pieces 14c, i.e. movable member 14, is moved.

With the linear guide device 11 of the structure mentioned above, when the motor is driven, the ball screw shaft 23 coupled with the rotating shaft of the motor through a joint is rotated and the rotational motion thereof is transmitted to the slide member 22 by way of the ball screw and the slide member 22 is hence moved linearly along the guide rail 2 1.

According to this motion, as shown in FIG. 1, the movable member 14 fixed to the slide member 22 is also moved linearly and the coupling pieces 14c are thereby moved linearly along the longitudinal directions of the openings 13. During this motion, since the openings 13 are covered by the upper and lower seal members 15a and 15b, which are overlapped to each other, the inside portions of the outer cover 12 and the linear guide device 11 are substantially completely sealed even during the linear motion of the movable member 14. The coupling pieces 14c of the movable member 14 forcibly opens outward the upper and lower seal members 15a and 15b and moves so as to push aside the seal members. After passing the coupling pieces 14c, the upper and lower seal members 15a and 15b return in their original shape due to their own elasticity or flexibility thereby to again seal the inside portions of the outer cover 12 and the linear guide device 11. That is, it is to be said that the upper and lower seal members 15a and 15b are opened only at portions through which the movable member 14 is passing during the reciprocal motion thereof.

Figure 5:
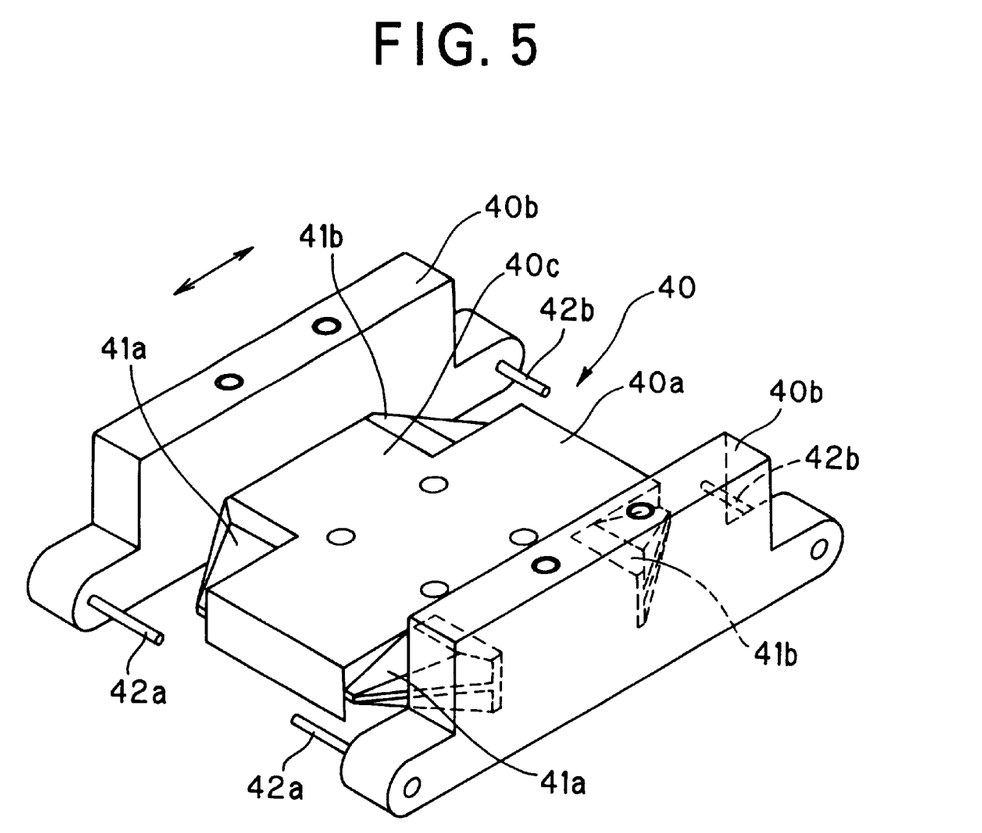
FIG. 5 is a perspective view of another example of a movable member of the guide apparatus.

FIG. 5 is a perspective view showing another example of the movable member as movable member 40. The movable member 40 is provided with a movable body 40a and a pair of lugs (side pieces) 40b attached to both side portions of the movable member 40. The movable body 40a has width reduced portions formed as coupling portions 40c through which the side pieces 40b are attached. The coupling portions 40c each has a dimension reduced in length in the movable member moving direction, and guide pieces 41a and 41b are attached to the width reduced portions at both ends thereof in the moving direction of the movable member and have sharp end shapes suitable for pushing aside the seal members as mentioned in detail hereinlater. That is, these guide pieces 41a and 41b are provided at four corner portions formed by the movable body 40a and the coupling portions 40c.

Figure 6A:
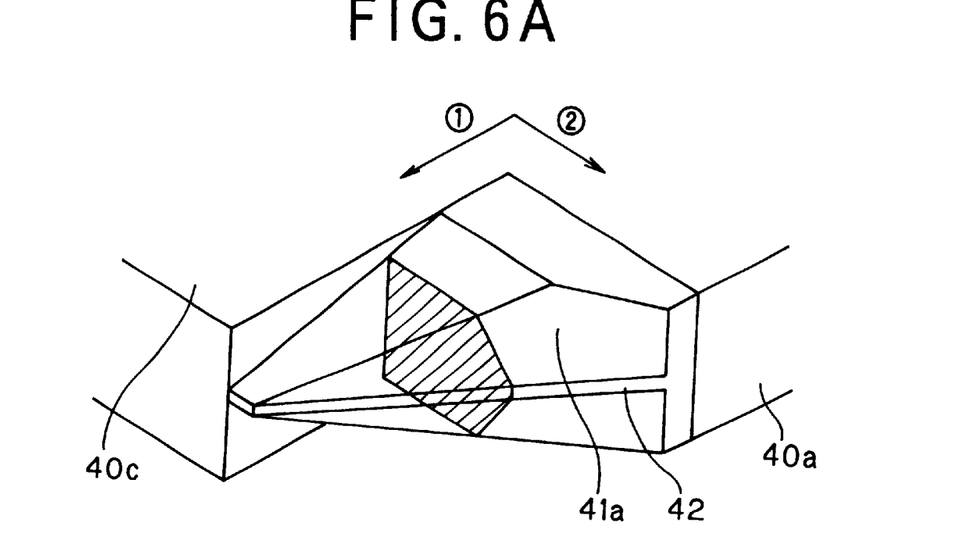
Figure 6B:
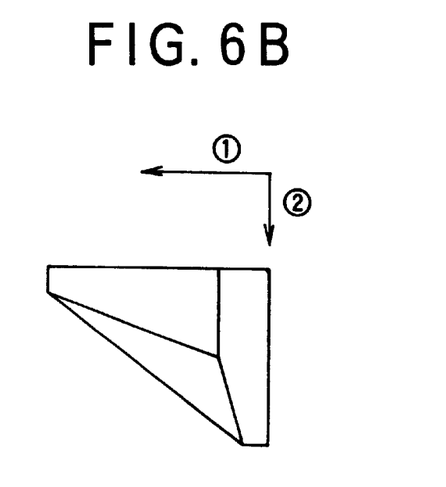
Figure 6C:
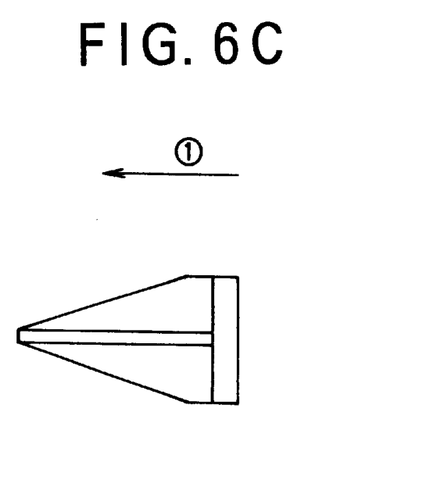

FIGS. 6A to 6C are views showing such guide piece in an enlarged scale.

With reference to FIG. 6B, the guide piece 41a has a portion gradually widened in an outside direction (direction ②.) reverse to the advancing direction (direction ①.) thereof, and as shown in FIG. 6C, the side surface of the guide piece 41 has an acute shape towards the direction ①. Furthermore, the sectional shape of the guide piece has a protrusion towards the direction ②. normal to the advancing direction ①. so as to provide substantially pentagonal shape as shown with hatched line in FIG. 6A. Further, the guide piece 41b has substantially the same shape as that of the guide piece 41a and is mounted to the corner portion of the movable member 40 on the rear side thereof so as to direct a direction reverse to the guide piece 41a. Further, it is to be noted that since the movable member 40 takes place a reciprocal motion, the advancing direction of the guide piece 41b is a direction reverse to the advancing direction of the guide piece 41a.

With reference to FIG. 5, a pair of rod-shaped closing pins 42a and 42b are attached to both longitudinal end portions of each of the side pieces (lugs) 41b of the movable member 40. These closing pins 42a and 42b are disposed at portions on both sides of the front ends of the guide pieces 41a and 41b at a height level equal to the location of a central slit portion 42 formed on the side surface of the guide piece 41a (41b) so as to extend inside horizontally to positions near the location of the seal members 15a and 15b. Further, the closing pins 42a and 42b attached to the side pieces 40a and 40b are symmetrically arranged with each other.

Figure 7:
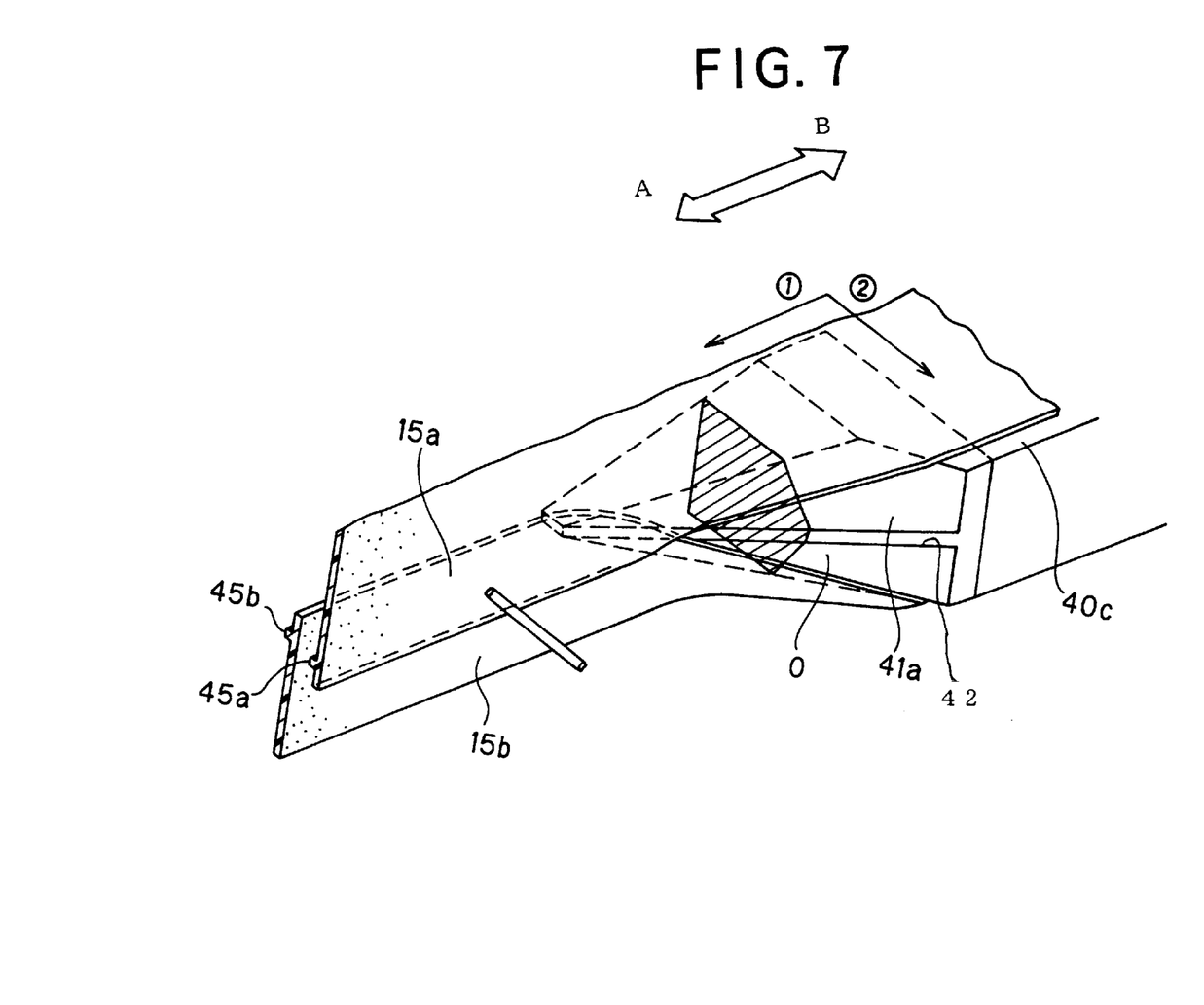
FIG. 7 is a perspective view showing a state that the guide piece separates and pushes aside a seal member of the guide apparatus.

FIG. 7 shows a state that the upper and lower seal members 15a and 15b are separated and pushed aside by the guide piece 41a in accordance with the advancing motion of the movable member 40. That is, first supposing a case that the movable member 40 advances in the direction A in FIG. 7, the upper and lower seal members 15a and 15b closing the openings 0 at both the sides of the linear guide device 11 are pushed aside and gradually opened in accordance with the advancing of the guide pieces 41a in the direction 1. In such advancing motion, since the guide pieces 4 1a have the sharp front ends in the advancing direction and the outwardly widened side portions towards the direction reverse to the advancing direction, the upper and lower seal members 15a and 15b are gently deformed and opened. For this reason, the sealing performance between the seal members 15a and 15b and the guide pieces 41a can be properly maintained and the possibility of forming any gap therebetween can be surely prevented. The deformed seal members 15a and 15b are finally bent at an angle of 90° at the upper and lower surfaces of the coupling portions 40c.

Next, supposing a case that the movable member 40 is moved in the direction B as shown in FIG. 7, the opened seal members 15a and 15b during the advancing motion of the movable member 40 are gradually deformed and then returned to their original closed positions by their own elastic property in accordance with the backward movement thereof with the sealing property being well maintained and the possibility of forming any gap therebetween can be also surely prevented.

Further, it is to be easily noted that when the movable member 40 is moved in the direction A, the seal members 15a and 15b are closed at the opposed side portion of the movable member 40 by the guide pieces 41b , and on the contrary, when the movable member 40 is moved in the direction B, the seal members 15a and 15b are opened at this side by the guide pieces 41b.

Further, it may be better to form a protrusions continuously on the sliding surfaces between the seal members 15a and 15b and the guide pieces 41a and 41b in the longitudinal direction thereof. The formation of such protrusions reduces contacting areas, i.e. friction areas, of the guide pieces 15a and 15b and the guide pieces 41a and 41b thereby to reduce the friction resistance which may be caused at the time of the linear motion of the movable member 40.

In the meantime, in a case where the movable member 40 carries out the reciprocal motion repeatedly, there may cause a case that the seal members 15a and 15b are not completely returned to their original shapes (positions) and maintain their bent states, and hence, the openings 0 are not completely closed. Even in such case, according to the described embodiment of the present invention, since the closing pins 42a and 42b are disposed at both sides of the guide pieces 41a and 41b, the bent portions of the seal members 15a and 15b are forcibly bent inside by the closing pins 42a and 42b at a time when these pins pass through the openings 0. Accordingly, even in the case where the openings 0 are not completely closed, the seal members 15a and 15b are forcibly returned to their original positions, thus completely closing the openings 0.

Figure 8:
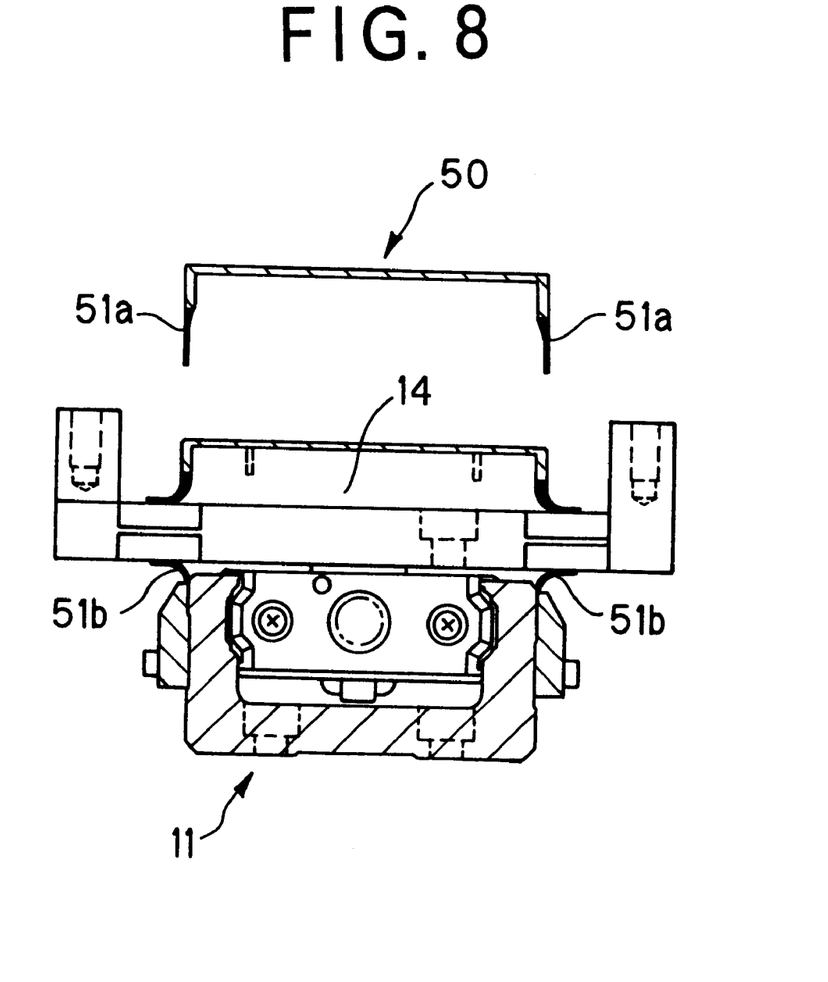
FIG. 8 shows a sectional view of another example of an outer cover of the guide apparatus.

FIG. 8 shows another example of the outer cover, and in the outer cover 50 in this example, seal members 51a are bonded to lower end portions of the side surfaces of the outer cover 50. Each of the seal members 51a is tapered to a front end in section thereby to be easily bent and reduce the friction resistance during the linear motion of the movable member 14. A proper bonding agent or material will be optionally selected in accordance with the material constituting the seal members 51a and the outer cover 50. According to this example, since the outer cover 50 and the seal members 51a are integrally formed, the number of members or elements, such as fastening members, can be reduced, and hence, the total weight of the outer cover 50 and the seal members 51a can be also reduced. Furthermore, these members are fastened together by means of bonding agent without using any mechanical means such as screw, the seal members 51a are prevented from being attached to the outer cover 50 in a inclined state, for example.

Figure 9:
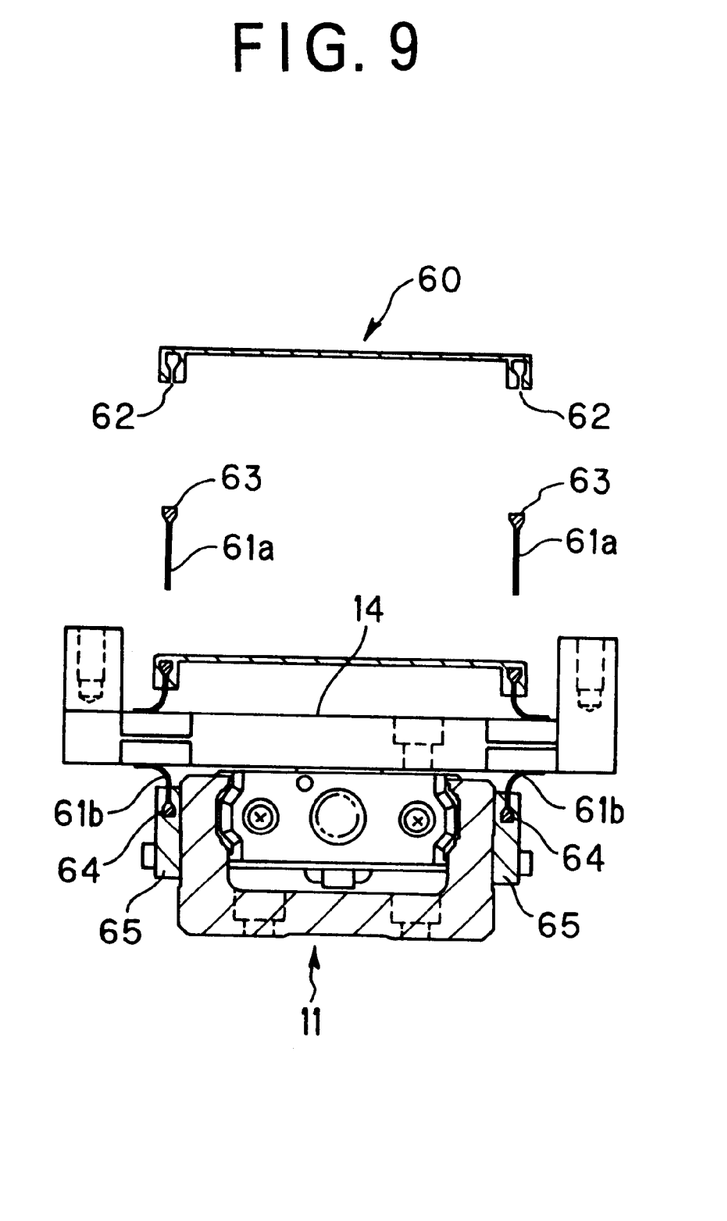
FIG. 9 shows a sectional view of a further example of the outer cover of the guide apparatus.

FIG. 9 shows another example of the outer cover, and in this example, the outer cover 50 is formed with dovetail grooves 62 at both the longitudinal end portions thereof and seal members 61*a* are formed with swelled or protruded portions 63 at their upper portions, which have shapes adapted to be fitted to the dovetail grooves 62, respectively. Therefore, the seal members 61a and the outer cover 60 are formed integrally by engaging the swelled portions 63 with the dovetail grooves 62, respectively. Furthermore, the other seal members 61b are also formed, at their lower end portions, with swelled or protruded portions 64, which are engaged with seal member receivers 65 in shape of dovetail grooves formed to the side surfaces of the linear guide device 11.

According to this example, as mentioned above, since the seal members are mounted to the outer cover and the guide device using the engagement of the swelled portions with the dovetail grooves, deteriorated seal members can be easily exchanged with new ones.

It is to be noted that the present invention is not limited specifically to the described embodiments and many other changes and modifications may be made without departing from the scopes of the appended claims.

What is claimed is:

1. A guide apparatus having a dustproof structure comprising:
   a linear guide device;
   an outer cover mounted on and covering said linear guide device, said outer cover having an opening extending in a longitudinal direction of said linear guide device;
   said linear guide device including a movable member having a portion projecting outwardly through said opening and being movable along said opening; and
   a plurality of flexible, belt-shaped seal members attached to edge portions of said opening that overlap one another to substantially seal said opening to enclose said linear guide device within said outer cover.

2. The guide apparatus according to claim 1, wherein said movable member comprises a guide structure having angled portions at each longitudinal end thereof to separate and push aside said overlapping seal members during movement of said movable member.

3. The guide apparatus according to claim 2, wherein said guide structure and said movable member are separate elements.

4. The guide apparatus according to claim 2, wherein said movable member further comprises a closing member that projects toward one of said seal members to urge said one seal member against another of said seal members.

5. The guide apparatus according to claim 2, wherein at least on of said plurality of seal members comprises a longitudinally extended protrusion.

6. The guide apparatus according to claim 1, comprising two of said openings on opposite sides of said outer cover and wherein said movable member has two said portions, each said portion projecting outwardly through a different one of said two openings.

7. A guide apparatus having a dustproof structure comprising:
   a linear guide device having a generally U-shaped cross section;
   an outer cover covering an open side of said linear guide device while leaving an opening between said outer cover and a side wall of said linear guide device;
   said linear guide device including a movable member and a linear member, said movable member moving along said linear member, said movable member having a portion projecting outwardly through said opening and moving along said opening when said movable member moves along said linear member; and
   a plurality of flexible belt-shaped seal members, said seal members being attached to edge portions of said outer cover and to said side wall of said linear guide device and overlapping one another to substantially seal said opening.

8. The guide apparatus according to claim 7, comprising two of said openings, two said portions projecting through respective ones of said two openings and extending from opposite sides of said movable member, said projecting portion comprising guide pieces positioned to correspond to overlapped portions of said seal members.

9. The guide apparatus according to claim 8 further comprising vertically extending side lugs connected to said projecting portions.

10. The guide apparatus according to claim 9, wherein said guide pieces have sharp end portions in directions of movement of said movable member.

11. The guide apparatus according to claim 10, wherein said sharp end portions push aside and separate said overlapped portions when said movable member is moving, said guide pieces having angled portions.

12. The guide apparatus according to claim 11, wherein said guide pieces are integral with said movable member.

13. The guide apparatus according to claim 11, wherein said guide pieces are independent from said movable member.

14. The guide apparatus according to claim 9, wherein said movable member further comprises a closing member, said closing member having a pair of rod shaped pins attached to said movable member and projecting toward said overlapped portions of said seal members.

15. The guide apparatus according to claim 7, wherein said seal members are flexible rubber.

16. The guide apparatus according to claim 7, wherein said seal members are flexible synthetic resin material.

17. The gueide apparatus according to claim 7, wherein said seal members are bonded to said edge portions of said outer cover and each of said seal members is tapered.

18. The guide apparatus according to claim 7, wherein said outer cover has dovetail grooves and said seal members have swelled end portions to fit into said dovetail grooves.

\* \* \* \* \*